(12) United States Patent
Groppi et al.

(10) Patent No.: US 7,003,940 B2
(45) Date of Patent: Feb. 28, 2006

(54) SYSTEM FOR CONTROL AND REGULATION OF THE FLAME TEMPERATURE FOR SINGLE-SHAFT GAS TURBINES

(75) Inventors: Stefano Groppi, Pistoia (IT); Andrea Casoni, Florence (IT)

(73) Assignee: Nuovo Pignone Holding S.P.A., Florence (IT)

( * ) Notice: Subject to any disclaimer, the term of this patent is extended or adjusted under 35 U.S.C. 154(b) by 294 days.

(21) Appl. No.: 10/452,922

(22) Filed: Jun. 3, 2003

(65) Prior Publication Data

US 2004/0040279 A1    Mar. 4, 2004

(30) Foreign Application Priority Data

Jun. 6, 2002   (IT) ........................... MI2002A1231

(51) Int. Cl.
*F02C 9/22*    (2006.01)
(52) U.S. Cl. .................................... 60/39.25
(58) Field of Classification Search .............. 60/39.25, 60/39.27, 39.281, 238, 240, 243
See application file for complete search history.

(56) References Cited

U.S. PATENT DOCUMENTS

| | | | | |
|---|---|---|---|---|
| 4,258,545 A | * | 3/1981 | Slater | 60/243 |
| 5,083,277 A | * | 1/1992 | Shutler | 60/39.281 |
| 5,394,689 A | * | 3/1995 | D'Onofrio | 60/39.281 |

* cited by examiner

*Primary Examiner*—Louis J. Casaregola
(74) *Attorney, Agent, or Firm*—Nixon & Vanderhye P.C.

(57) ABSTRACT

In order to limit the flame temperature peaks following sudden load variations, corresponding control is planned of the position of the blades (13) of the distributor with variable geometry, of a single-shaft gas turbine (18); in particular, the control system proposed comprises a direct-action regulator (21) consisting of a calculation unit (22), which implements the simplified running model of the gas turbine (18), and a feedback regulator (20), which makes it possible to recuperate any inaccuracies of the direct-action regulator (21), caused by variations of the performance of the turbine (18), relative to those planned by the model, or caused by modelling errors.

11 Claims, 2 Drawing Sheets

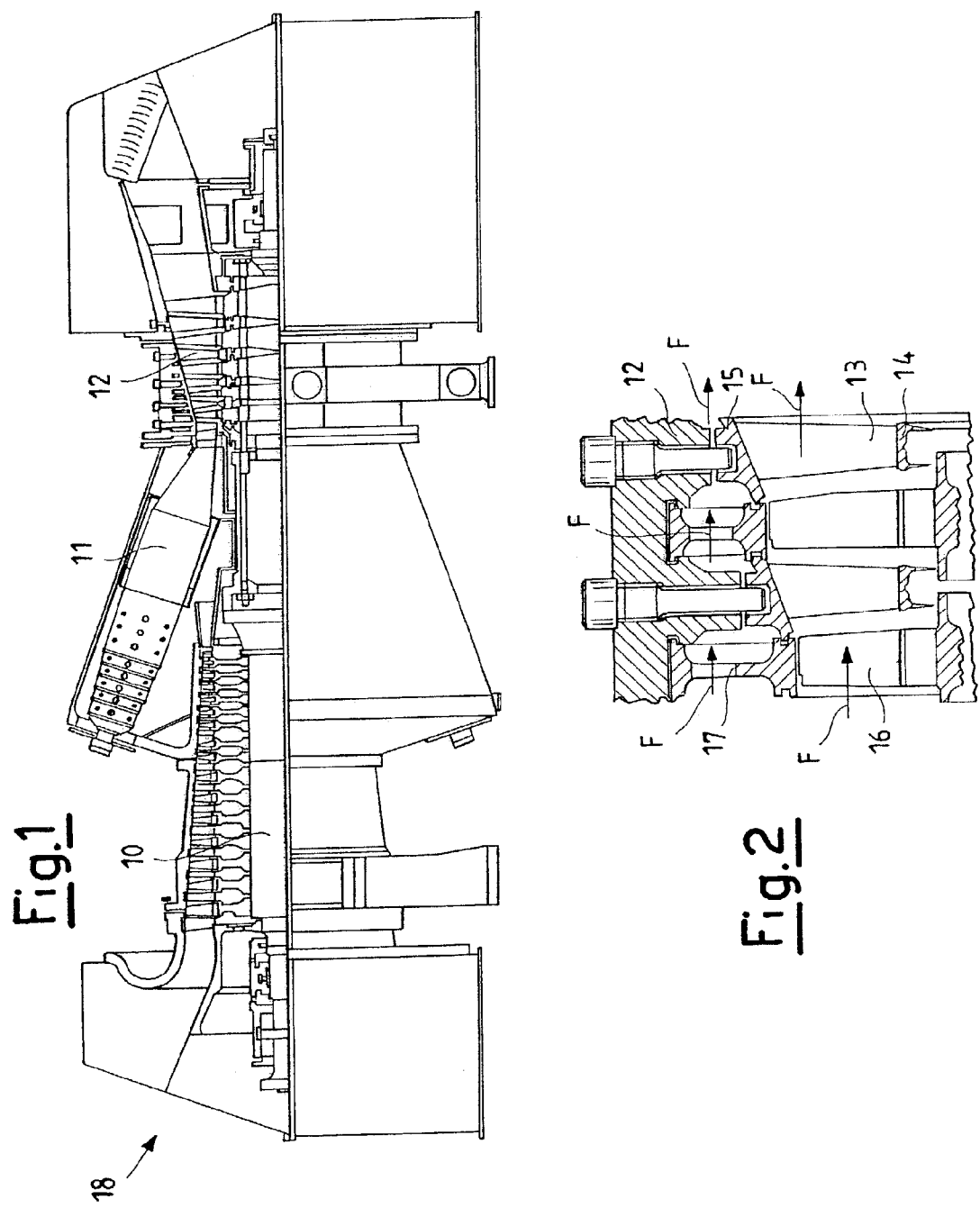

SYSTEM FOR CONTROL AND REGULATION OF THE FLAME TEMPERATURE FOR SINGLE-SHAFT GAS TURBINES

The present invention relates to a system for control and regulation of the flame temperature for single-shaft gas turbines.

It is known that gas turbines are machines which comprise a centrifugal compressor with one or more stages, optionally preceded by a transonic axial stage (for turbines with a low power level), a multiple-stage axial stage (for turbines with a medium and high power level), or a combined stage, with some axial stages followed by a centrifugal stage (for machines with a medium power level).

In particular, in single-shaft turbines, all the bodies of the compressor and of the turbo-expander are fitted on the same shaft, which is also that of the user machine.

The liquid or gaseous fuel is injected inside the combustion chamber by means of an injector, and in view of the need to have the gases at the outlet of the chamber at a temperature which is substantially lower than that which corresponds to combustion with stoichiometric metering, the typical structure of the chamber itself is that of a flame tube, according to which a part of the air is introduced into the front area, mostly via a vortex unit, in order to begin the combustion and give rise to an area of re-circulation of the hot gases.

A further flow of air for completion of the combustion is introduced via a first series of holes provided in the flame tube; downstream, the remaining part of the air is gradually mixed with the burnt gases, until the desired temperature is obtained at the outlet of the combustion chamber.

The internal flame tube, which reaches the highest temperatures, is structurally separate from the outer envelope, which is subjected to a high pressure difference; in this respect, in industrial applications, the most commonly used combustion chambers are single, i.e. with several flame tubes contained in a single envelope.

In addition, in external combustion turbines, the gas is heated inside heaters which are conceptually similar to the steam generators.

In particular, in gas turbines with medium and high power levels, the actual turbine or turbo-expander is of the multiple-stage axial type, with bladings similar to those of the steam turbines, except for the choice of materials, which must have optimum mechanical resistance to high temperatures, as well as to corrosion; in this respect, use is usually made of super alloys or first stage distributor blades, which are subjected to the maximum temperatures and are made of ceramic material.

For maximum temperatures which are not too high, a cooling process is then used with air which is taken from the compressor and is made to circulate in the channels which are provided between the roots of the blades as well as in the surfaces of the rotor discs; higher temperatures of the burnt gases can be allowed only by resorting to cooling of the entire surface of the blade.

In order to improve the characteristics of stability of the flame, there is also generally provided a parallel fuel feed system, which can generate pilot flames in the vicinity of the outlet of the mixing pipe, such that the high-temperature, high-pressure gas reaches via corresponding pipes the different stages of the turbine, which transforms the enthalpy of the gas into mechanical energy available to the user.

In any case, gas turbines for energy-generation applications are generally subjected to sudden variations of the electrical load, caused by the opening of the machine switch, or, if they are connected to an isolated network, caused by changes in the electrical usage.

In particular, during sudden increases of load, an abrupt increase occurs in the flame temperature calculated, which is well above the limit values permitted.

From this point of view, the control systems which are currently in use, and are based on the use of a predefined function for dependence of the position of the distributor blades in relation to the speed, or correct speed, of the axial compressor, or in relation to a method for regulation of the discharge temperature of the turbine, have not yet reached the desired performance levels in maintaining the flame temperature calculated below the limits planned, both in transitory operation conditions and in regular running.

The object of the present invention is thus to eliminate the disadvantages previously described, and in particular to provide a system for control and regulation of the flame temperature of a single-shaft gas turbine, which makes it possible to limit the flame temperature peaks following sudden variations of the electrical load, caused by opening of the machine switch or changes in the electrical use.

Another object of the present invention is to provide a system for control and regulation of the flame temperature of a gas turbine which is fed with liquid and/or gaseous fuel, which also makes it possible to obtain good stability of the flame and reduced pressure oscillations in the combustion chamber.

Another object of the present invention is to provide a system for control and regulation of the flame temperature of a gas turbine, which guarantees a high level of efficiency of combustion.

A further object of the present invention is to provide a system for control and regulation, which makes it possible to increase the average service life of the components which are subjected to high temperatures.

An additional object of the invention is to provide a system for control and regulation of the flame temperature of a single-shaft gas turbine, which is particularly reliable, simple, functional, and can be implemented at relatively low production and maintenance costs, in view of the advantages obtained.

These objectives and others according to the present invention are achieved by providing a system for control and regulation of the flame temperature of a single-shaft gas turbine, of the type comprising at least one first direct-action branch or regulator, which includes at least one calculation block which can implement a mathematical model for functioning of the said gas turbine, starting from a series of predefined parameters, characterised in that the said system also comprises one second feedback branch or regulator, which makes it possible to recuperate any inaccuracies in the said direct-action regulator, caused by variations of performance of the turbine relative to those planned by the said mathematical model, or caused by modelling errors.

Further particular technical characteristics are described in the successive claims.

Advantageously, the blades of the variable-geometry distributor of a gas turbine, which are also known by the acronym VIGV ("Variable Inlet Guided Vanes"), can be regulated in order to make them assume a suitable angle relative to the direction of the air admitted into the compressor, such as to increase the performance levels of the entire turbine, from the point of view of the speeds of the compressor, the flows of air, and the flow of fuel conveyed to the heater.

In particular, the control system according to the present invention makes it possible to limit the incidence of the phenomenon according to which, during sudden increases of load, there is an abrupt increase in the flame temperature calculated, which is well above the limit value permitted.

Specifically, appropriate control is obtained by assuring that the position of the distributor blades (VIGV) is dependent on the regulation of the temperature of the turbine discharge gases, on the flow of combustible gas, on the turbine speed, and on the temperature of the air admitted into the turbine, such as to obtain extremely accurate modelling of the entire turbine.

The characteristics and advantages of a system according to the present invention, for control and regulation of the flame temperature of a single-shaft gas turbine, will become clearer and more apparent from the following description, provided by way of non-limiting example, with reference to the attached schematic drawings, in which:

FIG. 1 is a schematic lateral view of a single-shaft gas turbine of the conventional type;

FIG. 2 is a schematic view, partially in cross-section, of a portion of the turbine in FIG. 1, corresponding to a surface portion of the rotor discs.

Figure 3:
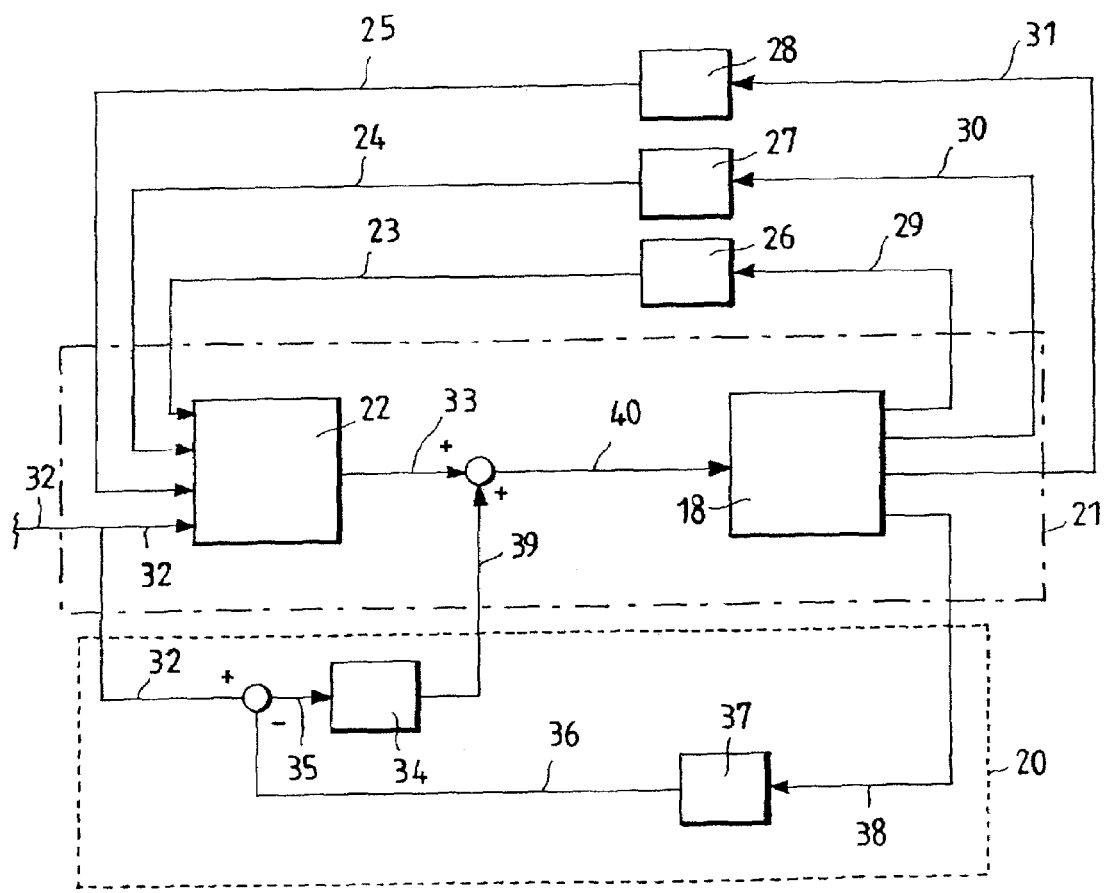
FIG. 3 relates to an embodiment, provided by way of non-limiting example, of a block operating diagram of the system according to the present invention, for control and regulation of the flame temperature for single-shaft gas turbines.

With particular reference to FIGS. 1 and 2, the gas turbine 18 comprises substantially an axial compressor 10, a heater 11 with low pollutant emissions for the gaseous fuel, and an axial turbine 12 of a known type.

In the example illustrated, the heater 11 has a frusto-conical head, immediately downstream from which the actual combustion area or main flame area is provided.

The assembly is also surrounded by a space for cooling air, which is pressurised by the axial compressor 10 and circulates in the direction of the arrows F in FIG. 2, which have directions opposite the direction of the flow of the combustion products output from the heater 11.

On the body of the turbine 12 there are then fitted a series of distributor blades (VIGV) 13 or blades of the first-stage distributor (which is subjected to the maximum temperatures), which are provided between an inner ring 14 and an outer ring 15 of the distributor, and are attached to a distributor-holder ring 17, and a series of rotary blades 16 of the rotor, which are optionally integral with the disc which supports them.

The distributor blades 13 assure that the air and/or fuel which passes through the blades has/have a predetermined direction of flow, such as to assist the stabilisation of the main flame.

Finally, in the combustion area, a series of parallel burners can be fitted, which can create a corresponding annular series of additional flames, which are concentric relative to the central main flame.

In particular, the cooling air is pressurised by the axial compressor 10, and cools the combustion chamber or heater 11, such that the air which enters the pre-mixing chamber is heated, and thus acts as combustion air.

In addition, an injection device, which is not illustrated in detail in the figures, supplies liquid fuel and thus creates the central or main combustion flame, whereas, by supplying additional liquid fuel, the circumferential series of burners creates in the combustion chamber 11 immediately downstream from the frusto-conical head, a corresponding annular series of additional pilot flames, which are concentric relative to the central main flame.

The objective of the solution proposed in the present description is to limit the flame temperature peaks, following sudden variations of load, by means of appropriate control of the position of the blades 13 of the distributor with variable geometry.

More specifically, control of the blades 13 is proposed by means of a regulation system such as that which is illustrated schematically in FIG. 3. As can be seen clearly in the figure, the system comprises a feedback branch, which is generally indicated as 20, and a direct-action branch, which is indicated as 21.

In turn, the direct-action branch 21 comprises a calculation block 22, which implements a simplified running model of the gas turbine 18, complete with the actuators provided.

The signals indicated as 23, 24, 25, and relating respectively to the combustible gas flow, the air temperature at the intake of the turbine 12, and the turbine speed 12, are input in block 22; the said signals are picked up at the output of the corresponding transducers 26, 27, 28, the inputs 29, 30, 31 of which constitute the respective signals measured directly on the gas turbine 18.

A further input of the block 22 is represented by the signal 32, which represents the desired value for the temperature of the discharge gases of the turbine. The block 22 also supplies as output the signal 33, which represents the estimated value of the position of the distributor blades 13, required in order to obtain the desired value for the temperature of the turbine discharge gases (signal 32), with the current values 29, 30, 31 of the gas flow signals, the speed of the turbine and air temperature at the intake of the turbine, and with the flame temperature lower than a predetermined limit value.

The control system also consists of the feedback branch 20, which consists of a proportional-integral regulator (PI regulator), which is generally indicated as 34 in FIG. 3, and has at its input an error signal 35, obtained as the difference between the temperature value required at the discharge (signal 32) and the current value 38, which in fact consists of the signal 36 picked up at the output from the transducer 37.

The output of the regulator 34 (signal 39) is then added to the signal 33 output from the measurer block 22, such as to obtain the correct estimated value (signal 40) of the position of the distributor blades 13, which is required in order to obtain the desired value for the temperature of the gases discharged from the turbine (signal 32), with the current values of flow, speed and temperature of the air (signals 29, 30, 31) and with a flame temperature lower than the limit value planned.

The regulator 34 of the feedback branch 20 thus makes it possible to recuperate any inaccuracies of the direct-action control (branch 21), which is implemented by means of a predefined function, and according to which the position of the distributor blades 13 depends on the speed, or on a correct value of the speed, of the axial compressor 10 or of the turbine 12.

In fact, the said potential inaccuracies of the direct-action branch 21 are caused by variations of the performance of the machine relative to those planned by the block 22, which constitutes the mathematical model for the gas turbine 18, or relative to modelling errors, and thus the presence of a further feedback branch 20 determines the possibility of making the position of the blades 13 (VIGV) dependent not only on the regulation of the temperature of the air admitted into, or discharged from the turbine 12, but also on the flow of combustible gas of the heater unit 11.

The implementation of the regulation system described in the turbines thus makes it possible to obtain an excellent result in terms of optimal control, by this means consolidating the good performance levels in maintaining the flame temperature calculated below the limits planned, both in transitory operating conditions and in regular running, as planned in the simulations carried out.

The description provided makes apparent the characteristics of the system which is the subject of the present invention, for control and regulation of the flame temperature of a single-shaft gas turbine, and also makes apparent the corresponding advantages, which, it will be remembered, include:

- reduced levels of pollutant emissions;
- reduced pressure oscillations in the combustion chamber and good stability of the flame;
- a high level of efficiency of combustion;
- an increase in the average service life of the components which are subjected to high temperatures;
- simple and reliable usage;
- relatively low production and maintenance costs, compared with the known art; and
- maintenance of the flame temperature calculated, below predetermined limit values.

Finally, it is apparent that many modifications and variations, all of which come within the scope of protection of the invention, can be made to the system thus designed, for control and regulation of the flame temperature for single-shaft gas turbines.

In addition, all the details can be replaced by elements which are technically equivalent, and, in practice, any materials, forms and dimensions can be used, according to the technical requirements.

The scope of protection of the invention is thus delimited by the attached claims.

What is claimed is:

1. A system for control and regulation of the flame temperature of a single-shaft gas turbine comprising at least one first regulator or direct-action branch, including at least one calculation block, which can implement a mathematical functioning model for said gas turbine, based on a series of predefined parameters, at least one second regulator or feedback branch, which makes it possible to recuperate any inaccuracies of said direct-action regulator caused by variations of the performance of the turbine, relative to those planned by said mathematical model, or caused by modeling errors, said first and second regulators acting on the blades of a distributor with variable geometry of a first stage of the said gas turbine, in order to make the blades assume a predetermined angle relative to the direction of the air which enters inside a compressor unit of said turbine to limit within predetermined values flame temperature increase during sudden load increases.

2. A system for control and regulation according to claim 1, wherein said single-shaft gas turbine comprises in series an axial compressor for conveying pressurized cooling air, a heater for gaseous fuel and an axial turbine, said heater having a frusto-conical head, and a main combustion area immediately downstream from said head.

3. A system according to claim 2, wherein said regulators make it possible to make the position of said blades of the distributor dependent on the regulation of the temperature of the discharge' gases of said axial turbine, on the combustible gas flow, on the speed of said axial turbine and on the temperature of the air admitted into said axial turbine.

4. A system according to claim 2, whereas said blades of the distributor are fitted on a body of said axial turbine, between an inner ring and an outer ring of said distributor, in order to assure that flow of air and/or fuel which passes through the blades has a predetermined direction, said axial turbine also supporting a series of rotary blades forming part of a rotor.

5. A system for control and regulation of the flame temperature of a single-shaft gas turbine comprising at least one first regulator or direct-action branch, including at least one calculation block, which can implement a mathematical functioning model for said gas turbine, based on a series of predefined parameters, at least one second regulator or feedback branch, which makes it possible to recuperate any inaccuracies of said direct-action regulator caused by variations of the performance of the turbine, relative to those planned by said mathematical model, or caused by modeling errors, signals relating to values of combustible gas flow, air temperature at the intake of said gas turbine, and speed of said gas turbine being input in the said calculation block, said signals being picked up at the output of corresponding transducers, the inputs thereof constituting said respective signals measured directly on said gas turbine.

6. A system according to claim 5, wherein said calculation block has at least one further signal at the input, which represents a desired temperature value of the discharge gases of the said gas turbine.

7. A system according to claim 6, wherein said first and second regulators act on distribution blades of a stage of the turbine, said calculation block supplying an output signal representing an estimated position value of said distributor blades required in order to obtain a desired temperature value of the discharge gases of said turbine, with the of the gas flow signals, speed of the turbine and temperature of the air admitted into the turbine, and with a flame temperature lower than a predetermined limit value.

8. A system according to claim 7, characterized in that said feedback branch includes at least one proportional-integral regulator, which has as input an error signal, which is obtained as the difference between said temperature value required at the discharge and a current value comprising a signal which is picked up at the output by a transducer of the said gas turbine.

9. A system according to claim 8, wherein said proportional-integral regulator has an output signal, which is added to a further signal output by said calculation block, such as to obtain a correct estimated value of the position of said distributor blades, said estimated value being required in order to obtain said desired temperature value of the gases discharged from the turbine, with said current values of flow, speed and temperature of the air, and with a flame temperature lower than the said planned limit value.

10. A system according to claim 9, wherein said proportional-integral regulator of said feedback branch makes it possible to recuperate inaccuracies of the said direct-action branch, said inaccuracies being caused by variations of the performance of the gas turbine, relative to those planned by the said calculation block, which constitutes a mathematical model for the gas turbine, or caused by modeling errors.

11. A system according to claim 10, wherein said feedback branch makes it possible to make the position of said blades of the distributor dependent on the regulation of the temperature of the air admitted into, or discharged from, the gas turbine, and on the flow of combustible gas of the said heater, such that implementation of said gas turbine regulation

* * * * *

UNITED STATES PATENT AND TRADEMARK OFFICE
CERTIFICATE OF CORRECTION

| | | |
|---|---|---|
| PATENT NO. | : 7,003,940 B2 | Page 1 of 1 |
| APPLICATION NO. | : 10/452922 | |
| DATED | : Feburary 28, 2006 | |
| INVENTOR(S) | : Groppi, S. et al. | |

It is certified that error appears in the above-identified patent and that said Letters Patent is hereby corrected as shown below:

At column 6 line 65 after the word "regulation" add the phrase "system makes it possible to obtain optimal control in maintaining the flame temperature calculated below planned limit values, both in transitory operating conditions and in regular running."

Signed and Sealed this

Twenty-fifth Day of July, 2006

JON W. DUDAS
*Director of the United States Patent and Trademark Office*